(12) United States Patent
Feliciano et al.

(10) Patent No.: US 11,204,066 B2
(45) Date of Patent: Dec. 21, 2021

(54) INSULATING DEVICE FOR A BEARING

(71) Applicant: Aktiebolaget SKF, Gothenburg (SE)

(72) Inventors: Paul Feliciano, Saint Cyr-sur-Loire (FR); Mathieu Hubert, Turin (IT); Tommy Jullien, Ambillou (FR); Thomas Perrotin, Saint Roch (FR); Anthony Simonin, Tours (FR)

(73) Assignee: AKTIEGOLAGET SKF

( * ) Notice: Subject to any disclaimer, the term of this patent is extended or adjusted under 35 U.S.C. 154(b) by 0 days.

(21) Appl. No.: 17/102,636

(22) Filed: Nov. 24, 2020

(65) Prior Publication Data
US 2021/0164518 A1 Jun. 3, 2021

(30) Foreign Application Priority Data
Nov. 28, 2019 (IT) .......................... 102019000022320

(51) Int. Cl.
*F16C 19/06* (2006.01)
*F16C 19/52* (2006.01)
(Continued)

(52) U.S. Cl.
CPC ............ *F16C 35/077* (2013.01); *F16C 19/06* (2013.01); *F16C 19/525* (2013.01);
(Continued)

(58) Field of Classification Search
CPC ...... F16C 19/06; F16C 19/525; F16C 33/586; F16C 35/077; F16C 37/007;
(Continued)

(56) References Cited

U.S. PATENT DOCUMENTS 5,375,933 A    12/1994  Mizutani et al.
5,420,389 A *  5/1995  Davies ................. B23K 11/063
                                                    219/64
(Continued)

FOREIGN PATENT DOCUMENTS

DE    202013102753 U1 *  9/2014  .............. F16C 19/52
FR    3039600 A1    2/2017
(Continued)

OTHER PUBLICATIONS

Search Report for French Patent Application No. FR2010786 dated Mar. 24, 2021.

*Primary Examiner* — Phillip A Johnson
(74) *Attorney, Agent, or Firm* — Reed Smith LLP

(57) ABSTRACT

An insulating device for a bearing mountable within a housing, the bearing having an inner ring and an outer ring with an outer circumferential surface and opposing axial ends and a plurality of rolling elements disposed there between. The insulating device comprises: a first annular part, which is adapted to be in contact to the outer circumferential surface of the outer ring, and a second annular part, which is also adapted to be in contact to the outer circumferential surface of the outer ring. The first and second part form the insulation device which is adapted to contact, in an assembled state of the bearing in the housing, both the outer ring and the housing. The first part is thermally conductive and electrically insulating and the second part is electrically insulating and less thermally conductive than the first part or is not thermally conductive.

19 Claims, 2 Drawing Sheets

(51) Int. Cl.
  *F16C 35/077* (2006.01)
  *F16C 37/00* (2006.01)
  *F16C 33/58* (2006.01)

(52) U.S. Cl.
  CPC .......... *F16C 33/586* (2013.01); *F16C 37/007* (2013.01); *F16C 2202/24* (2013.01)

(58) Field of Classification Search
  CPC .......... F16C 2202/24; F16C 2202/2206; F16C 2202/44; F16C 2223/70; C25D 11/02
  See application file for complete search history.

(56) References Cited

U.S. PATENT DOCUMENTS

| | | | | |
|---|---|---|---|---|
| 5,735,615 | A * | 4/1998 | Pontzer | H02K 5/1732 384/476 |
| 5,961,222 | A * | 10/1999 | Yabe | F16C 19/52 384/476 |
| 6,966,701 | B2 * | 11/2005 | Schelbert | F16C 35/077 384/476 |
| 10,050,490 | B1 | 8/2018 | Hubert et al. | |
| 10,422,384 | B2 | 9/2019 | Hubert et al. | |
| 2001/0014545 | A1 * | 8/2001 | Ito | F16C 33/62 439/17 |
| 2019/0120288 | A1 * | 4/2019 | Yamada | F16C 33/64 |

FOREIGN PATENT DOCUMENTS

| | | | | |
|---|---|---|---|---|
| FR | 3039601 | A1 | 2/2017 | |
| JP | 2011256891 | A * | 12/2011 | ............ F16C 19/525 |
| JP | 2012255564 | | 12/2012 | |

* cited by examiner

INSULATING DEVICE FOR A BEARING

CROSS REFERENCE OF RELATED APPLICATIONS

This application is based on and claims priority to Italian Application No. 102019000022320, filed Nov. 28, 2019, under 35 U.S.C. § 119, the entire contents of which are incorporated herein by reference.

FIELD OF THE INVENTION

The present disclosure relates to an insulating device for a bearing mountable within a housing for electrically insulating the bearing from the housing.

BACKGROUND

Bearing assemblies are well known and usually comprise an inner ring and an outer ring, wherein a plurality of rolling elements is disposed therebetween. In case a bearing assembly operates in an electric environment, such as an electric motor, damage can occur to the bearing components, when electric current passes through the bearing. To prevent such a flow of current it is known to provide the bearing rings with an insulating coating or an insulating encasing.

BRIEF DESCRIPTION OF THE DRAWINGS

The embodiments in accordance with this disclosure will now be described with reference to the appended drawings, which show some non-limiting examples of embodiment of the disclosure, in which.

DETAILED DESCRIPTION

Figure 1:
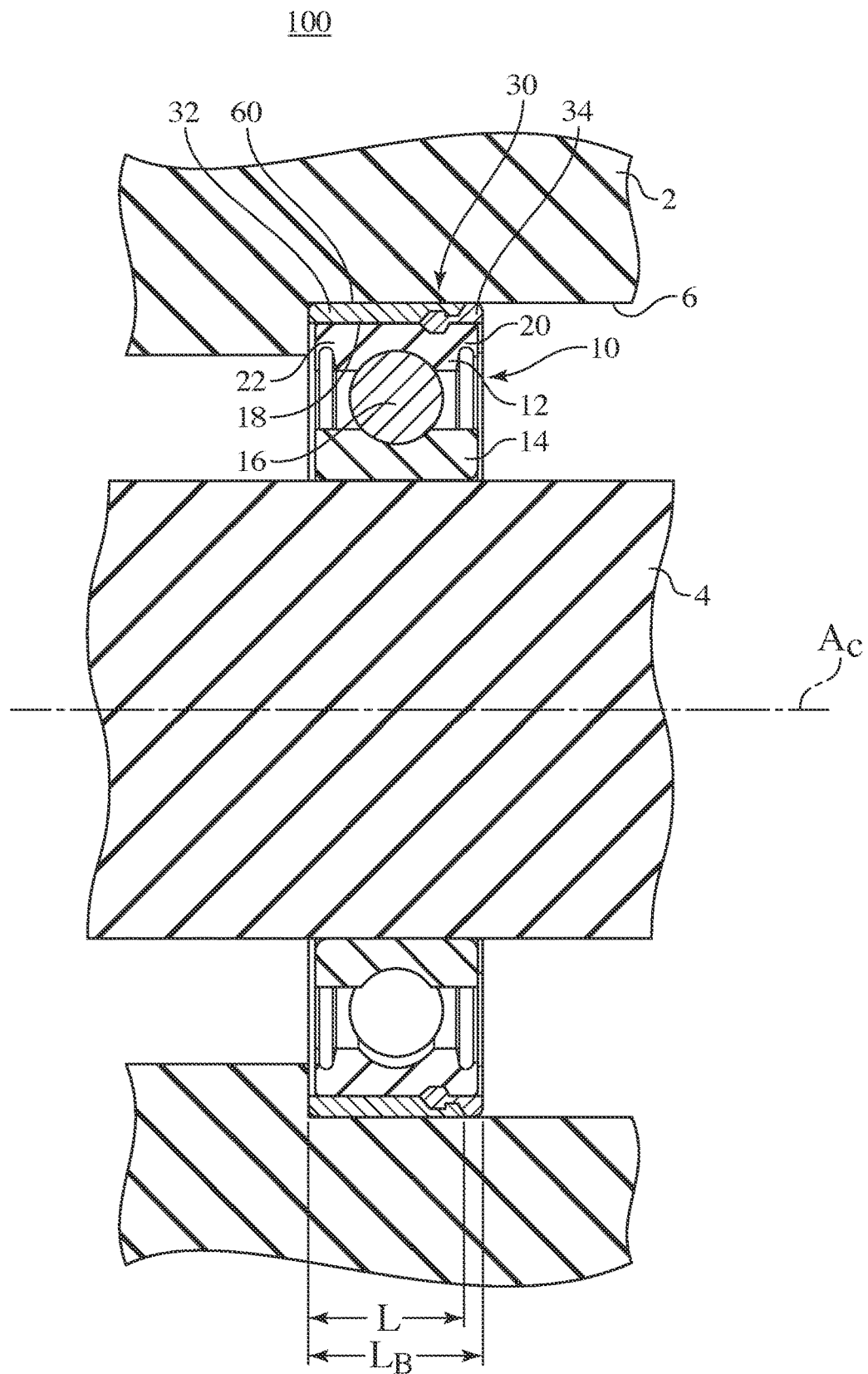
FIG. 1 shows an axial cross-sectional view of a bearing arrangement comprising an insulated bearing which is mounted between a shaft and a housing in accordance with the present disclosure.

It is known to provide the bearing rings with an insulating coating or an insulating encasing. Disadvantageously, even if the insulating materials used for covering the outer ring of metal bearings are cost effective, they are also thermally insulating which results in an increased operating temperature of the bearing components and thereby reducing the service life of such a bearing.

Alternatively, it is also known to use so called hybrid bearings, wherein the rolling elements are made from ceramic for providing the electric insulation and the rings are made from metal for providing a heat transfer. However, hybrid rolling bearings are very costly.

Consequently, embodiments of the disclosure provide a cost-effective insulation device for a bearing, which also allows for a good heat transfer from the bearing to the outside.

In the following, an insulating device for a bearing assembly is disclosed, wherein the bearing assembly is mountable into a housing. The bearing assembly usually has an inner ring and an outer ring with an outer circumferential surface and opposing axial ends, and a plurality of rolling elements are disposed between the inner ring and the outer ring. The insulating device further comprises a first annular part which is adapted to be in contact to the outer circumferential surface of the outer ring, and the second annular part, which is also adapted to be in contact to the outer circumferential surface of the outer ring. The first and the second part form the insulation device and are adapted to contact, in an assembled state of the bearing in the housing, both the outer ring and the housing.

For electrically insulating the bearing from the housing while not increasing the operating temperature inside the bearing, the first part is thermally conductive but electrically insulating, wherein the second part is electrically insulating, only. A material which is thermally conductive but electrically insulating is for example ceramic, such as aluminum oxide. An alternative is metal with an insulating coating, e.g. anodized aluminum.

Due to the thermally conductive material of the first part, heat which accumulates during operation of the bearing may be transferred from the bearing to the housing. In principle it would be also possible to use the thermally conductive and electrically insulating material for both the first and the second part of the insulating device. However, such a material is very expensive and difficult to attach to the outer ring. Thus, the second part is made from a less costly but nevertheless electrically insulating material.

Preferably, the second part is made from a plastic material which is thermally insulating and very cost effective. Plastic material has the further advantage that it can be manufactured to different shapes, e. g. by injection molding. Further, it is possible to overmold the ring with the plastic material. This allows for novel attachment possibilities of the insulating device, which will be explained further below.

According to a further exemplary embodiment, the first and second part abut against each other and/or overlap. Thereby, a continuous insulating device may be provided, which covers the complete outer circumferential surface of the outer ring. This ensures a continuous electric insulation between bearing and housing.

According to the further exemplary embodiment, the first and/or second part comprises an axially extending portion having an inner cylindrical surface, which is adapted to at least partly, contact and/or cover the outer circumferential surface of the outer ring, and a radially extending flange portion, which is adapted to at least partly contact and/or cover the axial ends of the outer ring. This design allows the insulation device to tightly fit onto the outer ring of the bearing, so that the outer ring is electrically insulated on all sides. Additionally, the radial flange portion may be used for fastening the insulating device to the outer ring.

It is further advantageous that the axial extending portion of the first part has a greater axial length than the axially extending portion of the second part. Thereby, an efficient large thermal contact surface maybe provided which in turn allows for a sufficient thermal conductivity so that heat does not accumulate in the bearing, but is transferred to the housing.

In a further exemplary embodiment, the first part has a first fastening structure and the second part has a second fastening structure, which is complementary to the first fastening structure, wherein first and second fastening structures are designed to fasten the first and second part in a form fit manner. Such a form fit engagement is possible since the material of the second part is chosen to be less stiff than the material of the first part, i.e. the ceramic. Thereby, the first and second part can be attached to each other in a form fit manner, even if one part is made from ceramic, which is usually too stiff to be used in a form fit engagement. The complementary fastening structures of the first and second part, which provide the form fit, allow for an easy and quick assembling of the insulation device to the bearing assembly.

Thereby, it is particularly preferred that the fasting structures of the first and second part are formed to have complementary recesses and protrusions, which engage, e.g. snap, into each other.

According to a further exemplary embodiment, the first and/or second part further comprises at least one retaining element, which is adapted to retain the first and/or second part to the outer ring. Besides the fastening of the first and second part to each other it is also necessary to provide a member configured to retain the insulating device to the bearing itself. Since the outer ring has to be fixed to the housing in a non-rotatable manner, any intermittently arranged part, such as insulating device, needs also to be fixed to the outer ring and to the housing in a non-rotatable manner, so that no relative motion between the insulating device and the outer ring and the housing may occur.

For attaching the insulating device to the outer rings, the insulating device preferably further comprises at least one retaining element which protrudes radially inwardly and is preferably arranged at the axial extending portion. The protruding element is further adapted to engage with a recess provided at the outer circumferential surface of the outer ring.

As above discussed above, the insulating device is preferably attached to the outer ring in a simple but secure manner. In the exemplary embodiment, wherein the second part is made from a slightly elastic/deformable material, i.e. less stiff material than the ceramic material of the first part, (e.g. plastic), it is preferred to assembly the outer ring and the insulating device as follows: The first part of the insulating device is arranged at the outer ring and then the second part is placed at the outer ring and snapped into the fastening structure at the first part and, at the same time, snapped into the recess or holding structure at the outer ring Thereby, an insulated bearing assembly may be provided, which can then be assembled to the housing/shaft.

A further aspect of the exemplary embodiments relates to an insulated bearing assembly comprising a bearing, which is mountable within a housing and has an inner ring and an outer ring, and a plurality of rolling elements disposed therebetween. Further the outer ring has an outer circumferential surface and opposing axial ends. At the outer circumferential surface of the outer ring an insulating device, as discussed above, is arranged and attached. Thereby an insulated bearing assembly maybe provided which allows for an easy attachment of the insulated device to the bearing and a non-rotatable mounting of the bearing to the housing.

Further exemplary embodiments are defined in the dependent claims as well as in the description and the figures. Thereby, elements described or shown in combination with other elements may be present alone or in combination with other elements without departing from the scope of protection.

In the following same or similar functioning elements are indicated with the same reference numerals.

FIG. 1 illustrates a bearing arrangement 100 comprising a bearing 10, which is mounted into a housing 2, and about a shaft 4, for supporting the shaft 4 rotatably in the housing 2. The housing, 2, the shaft 4, and the bearing 10 are rotatable about a central axis of rotation AC. The bearing has an outer ring 12 and an inner ring 14 and a plurality of rolling elements 16 (balls in the illustrated case) disposed between the rings 12 and 14. The outer ring 12 has further an outer circumferential surface 18 and opposing axial ends 20, 22 each having radially extending surface 24, 26 (see FIG. 2), respectively.

Figure 2:
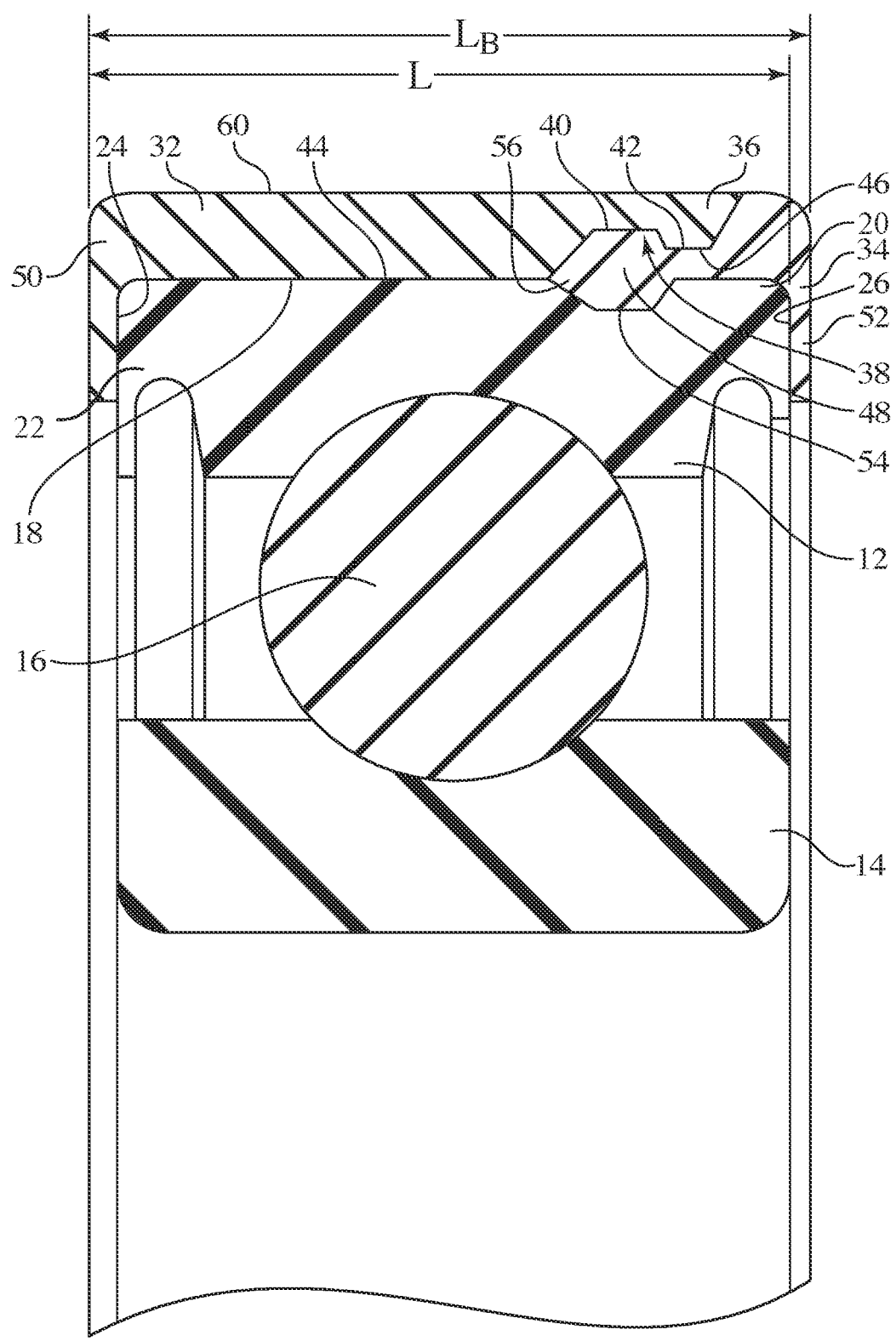
FIG. 2 shows an enlarged view of the upper portion of the insulated bearing of FIG. 1.

As is further shown in FIG. 1 and in greater detail in FIG. 2, an insulating device 30 is arranged between the outer ring 12 and the housing 2. The insulating device 30 prevents an electric current to pass from the shaft 4, through the bearing 10 to the housing 2. For that, the insulating device 30 is made from an electrically insulating material. As can be further seen, the insulating device 30 encases the outer ring 12 and extends along the outer circumferential surface 18 as well as along the radial surfaces 24, 26.

The problem with such insulating encasings is that heat, which generates during use of the bearing or operation of a machinery which comprises the bearing, cannot be transferred from the shaft 4 to the housing 2 and accumulates in the bearing 10. This in turn decreases the service life of the bearing 10, and also of the machinery which comprise the bearing 10.

For providing both a secure electrical insulation but also a good thermal conductivity, an insulating device 30 is provided which has two parts 32 and 34. The first part 32 extends along the outer circumferential surface 18 of the outer ring and is made from a thermally conductive and electrically insulating material, e.g., ceramic. The second part 34 also extends along the outer circumferential surface 18, and is made from an electrically insulating material, e.g., plastic, only that is not considered thermally conductive. In various embodiments in accordance with disclosure, the second part 34 is less thermally conductive than the first part 32. Alternatively, in some embodiments the second part 34 is made of an electrically insulating and thermally conductive material, e.g., ceramic, while the first part 32 is made of an electrically insulating material that is less thermally conductive than the second part 34.

In principal it could be also possible to make the complete insulating device 30 from the thermally conductive and electrically insulating material. However, this is very costly, and, in case ceramic is used, requires a sophisticated manufacturing process. Since ceramic is very stiff, an insulating device only made from ceramic needs to be precisely sized to the dimensions of the outer ring. Additionally, it is necessary to attach the insulating device securely to the outer ring, so that a non-rotatable attachment of the outer ring to the housing can be provided. This in turn requires that the insulating device is also non-rotatably attached to the outer ring and/or to the housing. In case the insulating device is made from ceramic such an attachment cannot be guaranteed.

Consequently, the second part 34 is made from a second material, which is electrically insulating but may be less stiff than ceramic, e.g. a plastic material, which in turn allows for both an easy manufacture and a secure and non-rotatable attachment of the insulating device to the outer ring. The second material or the plastic, respectively, may be a resilient material, or at least a slightly deformable material, so that the second part 34 may be attached to the first part 32 and/or to the outer ring 12, without breaking.

For fixing the first and second parts 32, 34, the first and second part comprises fastening structures 36, 38. In the illustrated non-limiting embodiment, the fastening structure 36 of the first part 32, is designed as groove 40 and a nose 42. The groove 40 extends radially outwardly from an inner circumferential surface 44 of the first part 32, which contacts the outer circumferential surface 18 of the outer ring 12, and is axially limited by the nose 42. The groove 40 and the nose 42 are designed such that the fastening structure 38 of the second part 34 may be snapped into. For that, the fastening structure of the second part 34 comprises a correspondingly and complimentarily designed groove 46 and nose 48, wherein the nose 48 of the second part 34 may be snapped into the groove 40 of the first part 32, and the nose 42 of the first part 32 may be snapped into the groove 46 of the second part 34. This ensures an axial and radial attachment of the first and second part 32, 34 for forming the insulating device 30. In order to fasten the first and second part 32, 34 also in circumferential direction, the groove 40 and/or the groove 46 of the second part are not designed as continuously annular grooves, but are provided as discrete recesses, which accommodate discrete protruding nose elements.

Besides fastening the first and second part 32, 34 to each other, it is also necessary to attach the insulating device 30 as such to the outer ring 12, preferably in a non-rotatable manner.

For that, both the first and the second part 32, 34 each have a radially extending flange portion 50, 52, which extends along the axial ends 20, 22 of the outer ring 12, respectively. In an assembled state—namely with the complementary fastening structures 36, 38 being engaged, the radial flange portions 50, 52 contact and abut against the radially extending surfaces 24 and 25 of the outer ring 12, and thereby prevent any axial movement of the insulating device 30.

Additionally, the insulating device 30 may have retaining means for retaining the insulating device to the outer ring 12. In the illustrated embodiment of FIGS. 1 and 2, the outer ring 12 is equipped with a recess 54, and the second part 34 comprises a further nose 56, wherein the nose 56 and the recess 54 are engaged. This allows for a strong coupling between insulating device 30 and outer ring 12 and ensures a secure attachment of the insulating device 30 to the outer ring 12. For avoiding any circumferential movement of the insulating device in relation to the outer ring 12, nose 56 and recess 54 may be designed as discrete elements.

The radial movement is also prevented since the insulating device 30 is arranged between and contact both the housing 2 and the outer ring 12.

As can be further seen from the illustrated embodiments, the first part 32 has an outer circumferential surface 60 which is in contact with an inner circumferential surface 6 of the housing 2. This contact allows for a heat transfer between the bearing 10 and the housing 2. For providing a very good heat transfer, a length L of the first part 32 and particularly of the outer circumferential surface 60 of the first part 32 is maximized. As illustrated, the outer circumferential surface 60 extends over almost the complete length LB of the bearing 10, which provides sufficient thermal contact for providing an optimized heat transfer from the bearing 10 to the housing 2. In some embodiments the length L is greater than 50% of the length of LB. In some embodiments, length L is between 50-99% of the length of LB. In some embodiment, length L is between 51-99% of the length of LB. In some embodiment, length L is between 60-90% of the length of LB. In some embodiments, length L is between 70-90% of the length of LB. In some embodiments, length L is between 75%-95% of the length of LB. In some embodiments, length L is between 80%-95% of the length of LB. In some embodiments, length L is between 80%-90% of the length of LB. In some embodiments, length L is about 60% of the length of LB. In some embodiments, length L is about 75% of the length of LB. In some embodiments, length L is about 80% of the length of LB. In some embodiments, length L is about 85% of the length of LB. In some embodiments, length L is about 88% of the length of LB. In some embodiments, length L is about 91% of the length of LB. In some embodiments, length L is about 95% of the length of LB. In some embodiments, length L is about 98% of the length of LB.

In summary by providing an insulating device which has two parts made from different materials, wherein only one material is thermally conductive, an insulated bearing assembly can be provided which allows for a good thermal management, good electric insulation and is cost effective and easy to manufacture.

There are numerous other variants in addition to the embodiments described above. Furthermore, said embodiments are merely examples that limit neither the scope nor the application nor the possible arrangements of the invention. Indeed, although the above description enables the person skilled in the art to carry out the present invention according to at least one example embodiment thereof, many variants of the described components can also be used without thereby moving outside the scope of the invention as defined in the attached claims, which should be understood literally and/or according to the legal equivalents thereof.

REFERENCE NUMERALS 100 bearing assembly
2 housing
4 shaft
6 inner circumferential surface of the housing
10 bearing
12 outer ring
14 inner ring
16 rolling elements
18 outer circumferential surface
20, 22 axial ends
24, 26 radially extending surfaces
30 insulating device
32 first part
34 second part
36, 38 fastening structures
40 groove
42 nose
44 inner circumferential surface
46 groove
48 nose
50, 52 flange portions
54 recess
56 nose
60 outer circumferential surface
L length of first part
LB length of bearing

What is claimed is:

1. An insulating device for a bearing mountable within a housing, the bearing having an inner ring and an outer ring with an outer circumferential surface and opposing axial ends and a plurality of rolling elements disposed therebetween, wherein the insulating device comprises:
   a first annular part, which is configured to be in contact with the outer circumferential surface of the outer ring; and
   a second annular part, which is configured to be in contact with the outer circumferential surface of the outer ring, wherein the first annular part and second annular part form the insulation device which is configured to contact, when in an assembled state, both the outer ring and the housing;
   wherein the first annular part is thermally conductive and electrically insulating, and the second annular part is electrically insulating;

wherein the material of the second annular part is thermally insulating.

2. The insulating device according to claim 1, wherein a material of the first annular part is a ceramic material.

3. The insulating device according to claim 2, wherein the ceramic material is aluminum oxide.

4. The insulating device according to claim 1, wherein the first annular part is made from a metal with an insulating coating.

5. The insulating device according to claim 4, wherein the insulating coating is anodized aluminum.

6. The insulating device according to claim 1, wherein the material of the second annular part is a plastic material.

7. The insulating device of claim 6, wherein the plastic material is injection molded or over-molded.

8. The insulating device according to claim 1, wherein the first and/or second annular parts comprise an axially extending portion having an inner cylindrical surface which is configured to at least partly contact and/or cover the outer circumferential surface of the outer ring, and a radially extending flange portion which is configured to at least partly contact and/or cover the axial ends of the outer ring.

9. The insulating device according to claim 1, wherein at least one of the first annular part and the second annular part further comprises at least one insulating device retainer.

10. The insulating device according to claim 9, wherein the at least one insulating device retainer is a protruding element which is arranged on the axially extending portion and protrudes radially inwardly, and is configured to be received in a recess provided at the outer circumferential surface of the outer ring.

11. An insulating device for a bearing mountable within a housing, the bearing having an inner ring and an outer ring with an outer circumferential surface and opposing axial ends and a plurality of rolling elements disposed therebetween, wherein the insulating device comprises:
   a first annular part, which is configured to be in contact with the outer circumferential surface of the outer ring; and
   a second annular part, which is configured to be in contact with the outer circumferential surface of the outer ring, wherein the first annular part and second annular part form the insulation device which is configured to contact, when in an assembled state, both the outer ring and the housing;
   wherein the first annular part is thermally conductive and electrically insulating, and the second annular part is electrically insulating;
   wherein the first annular part has a first form fit fastener and the second annular part has a second form fit fastener, which is complementary to the first form fit fastener.

12. The insulating device according to claim 11, wherein the first and second form fit fasteners comprise corresponding and complimentary protruding elements and recesses.

13. An insulated bearing assembly comprising:
   a bearing mountable within a housing;
   wherein the bearing has an inner ring and an outer ring and a plurality of rolling elements disposed therebetween;
   wherein the outer ring has an outer circumferential surface and opposing axial ends; and
   an insulation device on the outer circumferential surface of the outer ring;
   wherein the insulating device comprises:
   a first annular part, which is configured to be in contact to the outer circumferential surface of the outer ring, and
   a second annular part, which is also configured to be in contact to the outer circumferential surface of the outer ring, wherein the first annular part and second annular part form the insulation device which is configured to contact, in an assembled state of the bearing in the housing both the outer ring and the housing;
   wherein the first annular part is thermally conductive and electrically insulating, and the second annular part is electrically insulating and less thermally conductive than the first annular part.

14. The insulated bearing assembly according to claim 13, wherein the first and/or second annular parts comprises an axially extending portion having an inner cylindrical surface which is configured to at least partly contact and/or cover the outer circumferential surface of the outer ring, and a radially extending flange portion which is configured to at least partly contact and/or cover the axial ends of the outer ring.

15. The insulated bearing assembly insulated bearing assembly according to claim 14, wherein the axially extending portion of the first annular part has a greater axial length (L) than the axially extending portion of the second annular part.

16. The insulated bearing assembly according to claim 13, wherein the first annular part has a first form fit fastener and the second annular part has a second form fit fastener, which is complementary to the first form fit fastener.

17. An insulating device for a bearing mountable within a housing, the bearing having an inner ring and an outer ring with an outer circumferential surface and opposing axial ends and a plurality of rolling elements disposed therebetween, wherein the insulating device comprises:
   a first annular part, which is configured to be in contact with the outer circumferential surface of the outer ring; and
   a second annular part, which is configured to be in contact with the outer circumferential surface of the outer ring, wherein the first annular part and second annular part form the insulation device which is configured to contact, when in an assembled state, both the outer ring and the housing;
   wherein the first annular part is thermally conductive and electrically insulating, and the second annular part is electrically insulating;
   wherein the first and second annular parts are configured to at least abut against each other.

18. An insulating device for a bearing mountable within a housing, the bearing having an inner ring and an outer ring with an outer circumferential surface and opposing axial ends and a plurality of rolling elements disposed therebetween, wherein the insulating device comprises:
   a first annular part, which is configured to be in contact with the outer circumferential surface of the outer ring; and
   a second annular part, which is configured to be in contact with the outer circumferential surface of the outer ring, wherein the first annular part and second annular part form the insulation device which is configured to contact, when in an assembled state, both the outer ring and the housing;
   wherein the first annular part is thermally conductive and electrically insulating, and the second annular part is electrically insulating;
   wherein the first and second annular parts are configured to overlap.

19. An insulating device for a bearing mountable within a housing, the bearing having an inner ring and an outer ring with an outer circumferential surface and opposing axial ends and a plurality of rolling elements disposed therebetween, wherein the insulating device comprises:
- a first annular part, which is configured to be in contact with the outer circumferential surface of the outer ring; and
- a second annular part, which is configured to be in contact with the outer circumferential surface of the outer ring, wherein the first annular part and second annular part form the insulation device which is configured to contact, when in an assembled state, both the outer ring and the housing;
- wherein the first annular part is thermally conductive and electrically insulating, and the second annular part is electrically insulating;
- wherein the first and/or second annular parts comprise an axially extending portion having an inner cylindrical surface which is configured to at least partly contact and/or cover the outer circumferential surface of the outer ring, and a radially extending flange portion which is configured to at least partly contact and/or cover the axial ends of the outer ring;
- wherein the axially extending portion of the first annular part has a greater axial length (L) than the axially extending portion of the second annular part.

* * * * *